J. A. ANGLADA.
VEHICLE WHEEL RIM.
APPLICATION FILED SEPT. 1, 1910.
1,100,861.
Patented June 23, 1914.
3 SHEETS—SHEET 1.
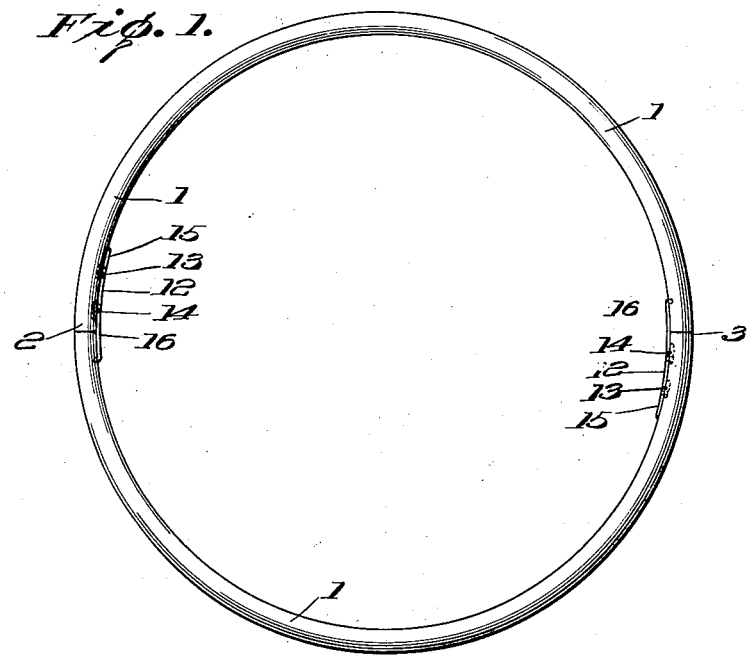
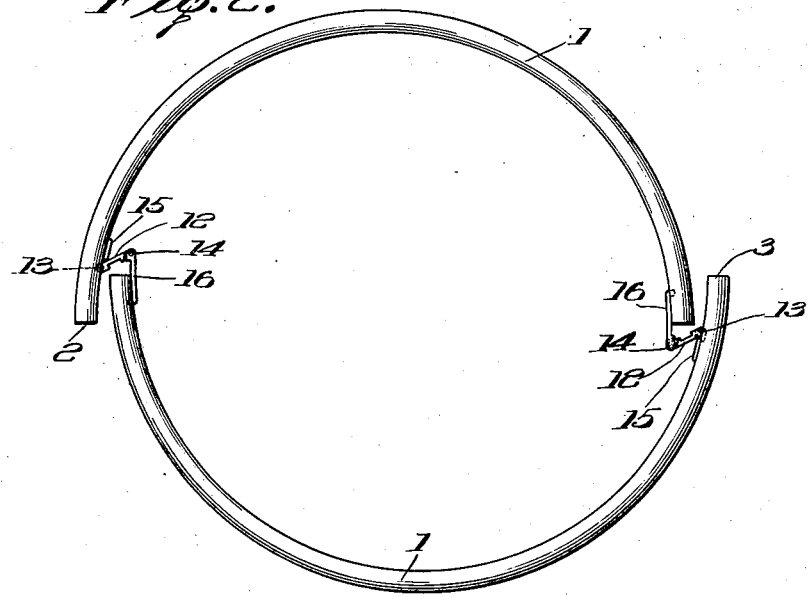
WITNESSES
Joseph A. Anglada INVENTOR
BY
Seward Davis
his ATTORNEY J. A. ANGLADA.
VEHICLE WHEEL RIM.
APPLICATION FILED SEPT. 1, 1910.
1,100,861.
Patented June 23, 1914.
3 SHEETS—SHEET 2.
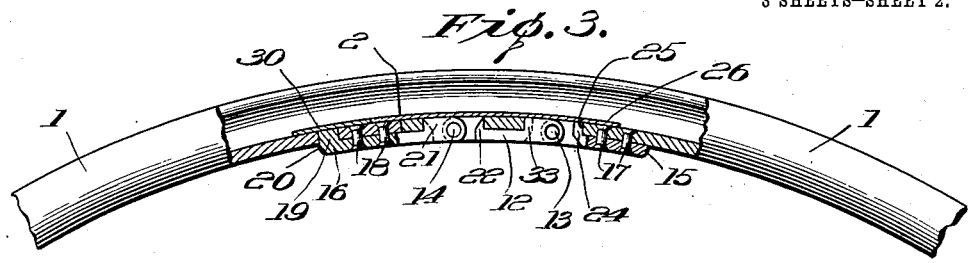
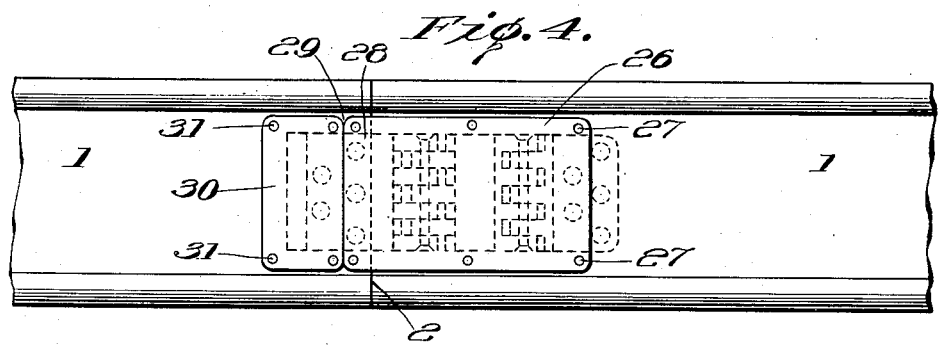
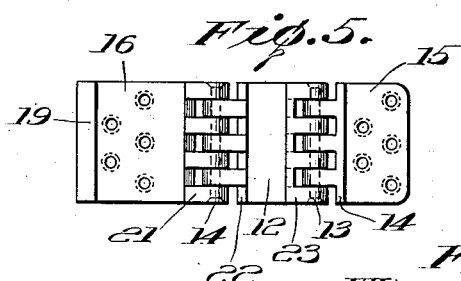
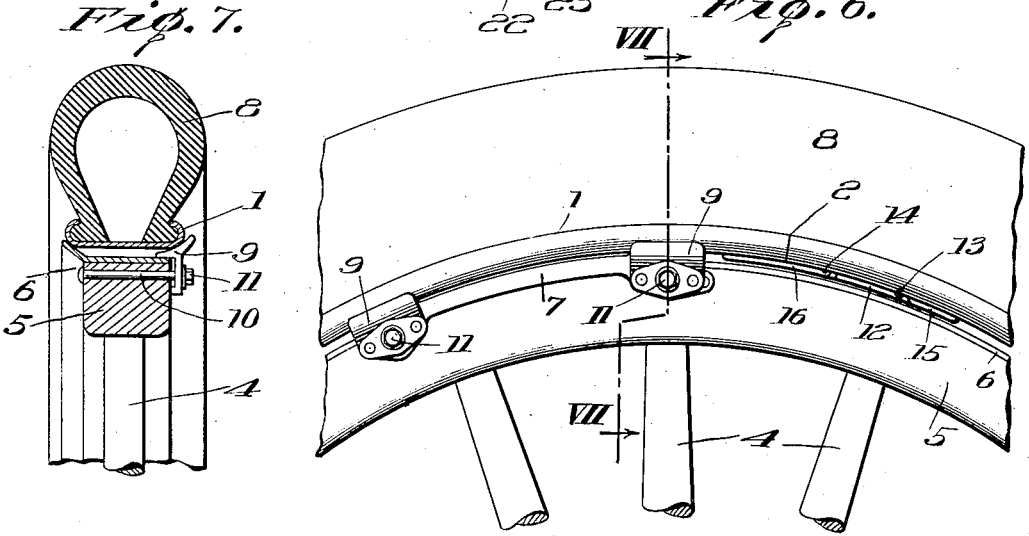
Witnesses:
Joseph A. Anglada, Inventor
By his Attorney J. A. ANGLADA.
VEHICLE WHEEL RIM.
APPLICATION FILED SEPT. 1, 1910.
1,100,861.
Patented June 23, 1914.
3 SHEETS—SHEET 3.
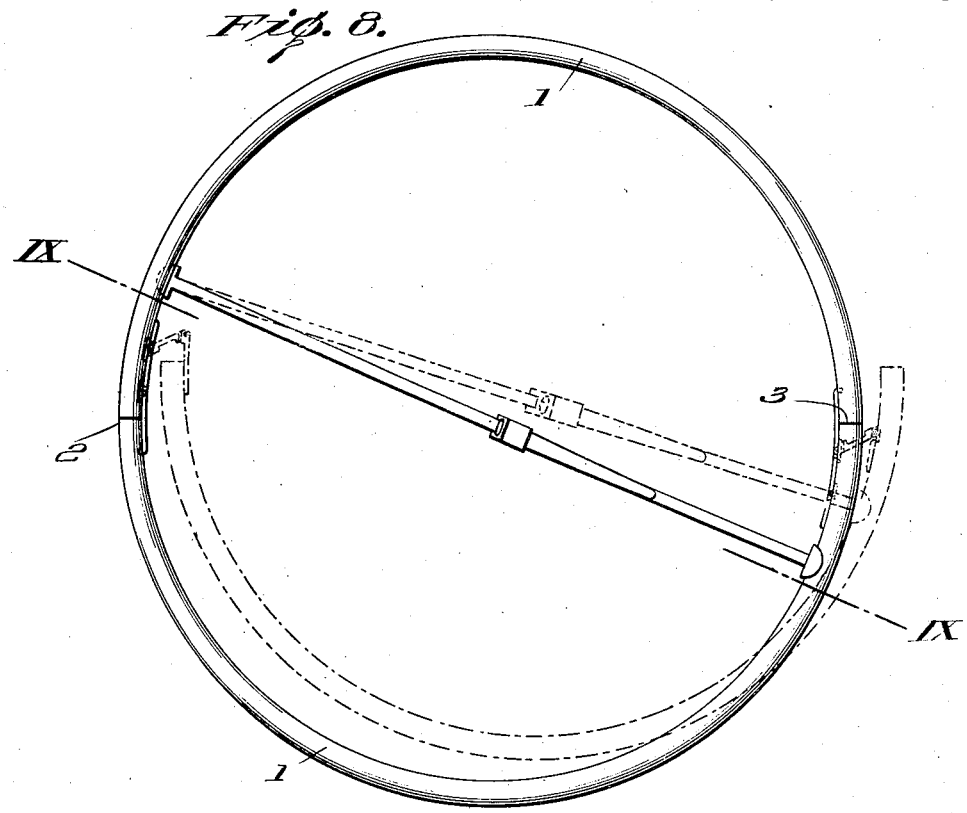
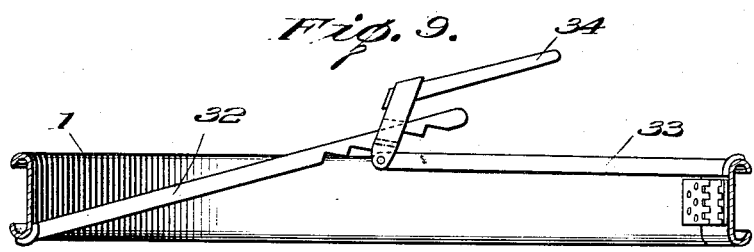
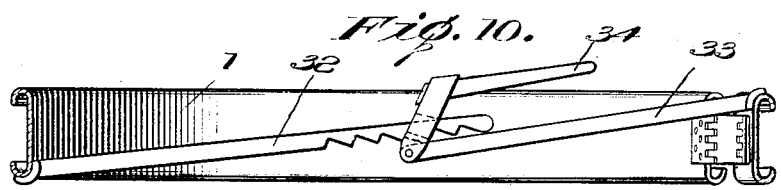
Witnesses:
Karl S. Drift
Oliver Williams
Joseph A. Anglada Inventor
By his Attorney
Seward Davis

UNITED STATES PATENT OFFICE.

JOSEPH A. ANGLADA, OF NEW YORK, N. Y., ASSIGNOR, BY MESNE ASSIGNMENTS, TO UNIVERSAL RIM COMPANY, OF CHICAGO, ILLINOIS, A CORPORATION OF ILLINOIS.

VEHICLE WHEEL-RIM.

1,100,861.      Specification of Letters Patent.      Patented June 23, 1914.

Application filed September 1, 1910. Serial No. 580,099.

*To all whom it may concern:*

Be it known that I, JOSEPH A. ANGLADA, a citizen of the United States, residing in the borough of Manhattan, city, county, and State of New York, have invented certain new and useful Improvements in Vehicle Wheel-Rims, of which the following is a specification.

My invention relates to vehicle wheel rims and specifically to that type of tire-carrying rim adapted to be detachably secured to the wheel of a vehicle, more especially to that of an automobile.

My invention provides a novel collapsible tire-carrying rim which, with the tire, may be removed as a unit from the wheel, the rim being then collapsed in order to permit the ready removal of the tire therefrom.

My new tire-carrying rim is a unitary structure having no separable parts to become lost or mislaid when the rim is demounted, and may be designed to accommodate either a clencher or Dunlop type of tire.

My rim belongs to that type in which the tire-carrying rim is itself transversely split at a plurality of points, means being provided for effecting the collapse or shortening in one direction of the diameter of the rim when it is desired to remove a tire therefrom.

In the accompanying drawings which form a part of this specification, Figure 1 is a side elevation of my improved tire-carrying rim in extended position; Fig. 2 is a similar view of the rim in collapsed position; Fig. 3 is a longitudinal sectional view of the rim at one of the points where it is split illustrating the uniting means; Fig. 4 is a plan view of the structure shown in Fig. 3; Fig. 5 is a detail plan view of the linkage used to connect the ends of the rim; Fig. 6 is a side fragmentary elevation of a portion of a vehicle wheel equipped with my device; Fig. 7 is a transverse sectional view on line VII—VII of Fig. 6; Fig. 8 is a side elevation of the tire-carrying rim showing means for effecting its collapse; Fig. 9 is a sectional view on line IX—IX of Fig. 8; Fig. 10 is a view similar to Fig. 9, showing the rim collapsed.

Referring to the drawings in detail, the numeral 1 designates a tire-carrying rim split at two points 2 and 3 lying substantially on a diameter. The rim is adapted to be mounted on a vehicle wheel 4, having the felly 5 and the felly band 6 permanently attached thereto, by means of the wedge member 7. Mounted upon the tire-carrying rim is the tire 8. The wedge member 7 includes a plurality of wedges 9 arranged circumferentially about the felly and adapted to be clamped into operative position by means of the bolt 10 passing through the felly and the nut 11 mounted on the end of the bolt.

Joining the ends of the rim at each point where it is split is a link 12 pivoted at 13 and 14, respectively, to the straps 15 and 16 fastened by means of the rivets 17 and 18, or in any other suitable manner, to the adjacent ends of the rim. Formed upon the strap 16 is the turned-up flange 19 entering a slot 20 in the rim. Upon the other end is another flange 21 also entering a slot in the rim. The adjacent portion of the link member has the flange 22 entering the same slot, and at its other end the flange 23 which, together with the shoulder 24, enters a slot 25 in the rim. It will thus be seen that when the rim is in operative position, the ends being circumferentially alined as illustrated in detail in Fig. 3, any strain coming upon the rim will be transmitted directly to the strap member 16, no strain being brought to bear upon the pivots at the joints of the straps with the link. At the same time this construction provides a structure which is economical of space and requires a minimum clearance between the tire-carrying rim and the felly band. Affixed to the external surface of the rim is the protective plate 26 fastened in place by the rivets 27, or in any other suitable manner. This plate has a section 28 projecting beyond the end of the section of the rim to which it is fastened. When the rim is in position to be placed upon the wheel, the edge 29 of this protective plate abuts against a similar plate 30 fixed to the adjacent end of the rim by the rivets 31, or in any other suitable manner. These plates coöperate to prevent the entrance of moisture or any foreign substance into the tire at the point where the rim is split. It is not necessary to make their width equal to the total width of the rim, as the beads of the tire will be sufficient to accomplish this result at the edges. In order to demount a tire from the wheel, the wedges 9 are withdrawn, permitting the tire and the tire-carrying rim to be removed as a unit.

The rim is then collapsed into a position similar to that illustrated in Fig. 2, one section sliding past the other, which action is made possible by the linkage connecting the adjacent ends of the rim where the latter is split. By collapsing the rim in this manner its effective diameter in one direction is substantially decreased, and it is then possible to remove the tire from the rim with ease. It is common knowledge that with large and heavy tires it is a difficult matter to spring the tire from under the clenches of an ordinary clencher rim having the same cross-section as the rim illustrated. My invention efficiently overcomes the prior objection to clencher rims having the clenches permanently fixed to the body of the rim, and is so designed that an ordinary clencher rim may be easily altered into a collapsible rim of my improved type.

While it is possible to collapse rims of even the largest sizes customarily used in automobile service without the use of tools. I find it advisable in some cases with the largest sizes to use a tool such as is illustrated in Figs. 8, 9 and 10. This tool comprises a modified toggle having the arms 32 and 33 engaging opposite sections of the rim near the points where it is split. By applying a force in a downward direction to the lever 34, the ends of the toggle arms will be forced away from each other and the rim collapsed into the position shown diagrammatically in broken lines in Fig. 8.

While I have illustrated only one modification of my rim, I do not wish to be limited thereto, as my invention is obviously of broad application.

Having thus described my invention, I claim:

1. A detachable rim for vehicle wheels transversely split at a plurality of points, and linkage connecting the adjacent ends of the rim and permitting one section of the rim to slide past the remainder.

2. A detachable rim for vehicle wheels transversely split at two points substantially diametrically opposite, and linkage joining the adjacent ends of the rim.

3. A detachable rim transversely split at a plurality of points and linkage connecting the adjacent ends of the rim and pivoted thereto at the inner periphery thereof.

4. A detachable rim for vehicle wheels transversely split at a plurality of points and linkage pivoted to the adjacent ends of the rim near the inner periphery thereof, one member of which spans the split in the rim, and when in operative position engages the rim on either side of the split.

5. A detachable rim for vehicle wheels transversely split at two points substantially diametrically opposite, and linkage pivoted to the adjacent ends of the rim at the inner periphery thereof.

JOSEPH A. ANGLADA.

Witnesses:
JOHN F. PAINE,
OLIVER WILLIAMS.